Patented Feb. 27, 1934

1,949,093

UNITED STATES PATENT OFFICE 1,949,093

ESTERS OF SECONDARY ALCOHOLS

Robert H. Van Schaack, Jr., Chicago, Ill., assignor to Van Schaack Bros. Chemical Works, Inc., Chicago, Ill., a corporation of Illinois No Drawing. Application September 25, 1930
Serial No. 484,470

5 Claims. (Cl. 260—103)

This application is a continuation, in part, of application for United States patent, Serial No. 309,365, filed September 29, 1928 upon which has issued U. S. Patent No. 1,815,878.

The invention relates to esters of secondary alcohols, particularly to esters of secondary hexyl, heptyl, and octyl alcohols, with phthalic or other polycarboxylic acid.

Such esters are useful as plasticizers for pyroxylin. As such, I may use to advantage esters of relatively high boiling point, as, for example, esters of polycarboxylic acids with secondary alcohols of boiling point above 132° C.

Examples of esters that fall within the scope of this invention are the oxalate, tartrate, citrate, succinate, maleate, phthalate, isophthalate, chlorophthalate, phenylglutarate, or mellitate of a secondary hexyl alcohol of boiling point above 132°, a secondary heptyl, and/or a secondary octyl alcohol.

For some purposes a mixture is especially desirable. Thus, for plasticizing pyroxylin lacquer films, a suitable composition is a neutral ester of a polycarboxylic acid, say, phthalic acid, with a mixture of alcohols comprising secondary hexyl alcohols of boiling point above 132° C., heptyl alcohols, and/or octyl alcohols. Such a mixture of alcohols may be derived from the olefins of cracked petroleum distillate by (1) fractionally distilling it to produce a fraction of boiling point above that of isobutyl ethylene and comprising olefins containing six to eight carbon atoms to the molecule, (2) treating this olefin-containing fraction with diluted sulfuric acid, say 75 parts sulfuric acid to 25 of water, at a low temperature, for example, 20° C., (3) separating by gravity the resulting, lower layer comprising alkyl sulfates, (4) diluting this separated layer with three times its weight of water, (5) fractionally distilling the alcohol mixture so produced, and (6) separating by gravity the lower, aqueous layer of the condensate from the upper layer of mixed alcohols. A mixture of alcohols of approximately this composition, whether produced as described or otherwise, is defined as alcohols corresponding to olefins of a cracked petroleum distillate, said olefins containing 6 to 8 carbon atoms to the molecule.

In preparing esters of the secondary alcohols corresponding to such olefins containing six to eight carbon atoms to the molecule, the alcohols may be used as a mixture. Or they may be fractionally distilled first to give mixtures of fewer components or even a single alcohol. In any case, the following process may be used for the esterification.

One molecular proportion of phthalic anhydride is warmed with an excess, say 2.5 molecular proportions of the alcohol or mixed alcohols, and 0.004 to 0.04 molecular proportions of sulfuric acid. After a few minutes' warming, the mixture is submitted to fractional distillation, to produce a condensate that separates into two layers. The lower layer of the condensate, containing a high percentage of water, is withdrawn. The upper layer, which is rich in alcohol (or alcohols), is returned to the still. When the rate of separation of water layer from the condensate becomes slow, or titration for acidity in the still indicates that the esterification is largely completed, the distillation is discontinued and the mixture remaining in the still is cooled to about 40° C. or below and neutralized with aqueous sodium carbonate solution. The neutralized oil or upper layer, comprising esters of the secondary alcohol or alcohols originally used, is submitted to partial distillation to remove water and, if desired, the unreacted alcohol or alcohols or other material, as by distilling up to a vapor temperature of 150° C. at a pressure equal to 4 mm. of mercury. The remaining ester or esters may then be purified, as by filtering through decolorizing carbon or distillation in a very good vacuum, say, at 3 to 30 mm. pressure.

Any one of the acids whose esters are disclosed above may be substituted for the phthalic anhydride in the above preparation.

Also, the proportions may be varied. Thus, there may be used a deficiency of the alcohol (or alcohols) and thus produced, with the excess of organic acid, an acidic ester, that is, an ester containing an unreacted carboxyl group. In such a case, another alcohol, as, for example methyl, ethyl, isopropyl, or n-butyl, may be added to the reaction mixture (after warming and fractionating to remove the water but before neutralizing), and the esterification continued until there is formed a substantial amount of mixed ester. In the so-called mixed ester, the alkyl radical of the alcohol last added will be found in a molecule of the finished ester as well as the alkyl radical of one or more of the alcohols initially added. The mixed ester may then be neutralized and purified as described above.

It will be understood that mixed esters are obtained also on esterifying a mixture of hexyl alcohols and/or higher secondary alcohols with a polycarboxylic acid, without the later addition of a different alcohol. Thus a mixture of secondary hexyl, heptyl, and octyl alcohols esterified with polycarboxylic acids gives esters of these types:

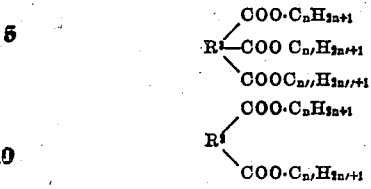

in which $R^2$ and $R^3$ represent organic radicals of valencies expressed by the superscripts, that is, 2 and 3, respectively, n, n', and n'', varying independently of each other, may each be 6, 7, or 8, and the alkyl radicals are all secondary.

Examples that illustrate the type formulas, in this case secondary phthalate esters, follow:

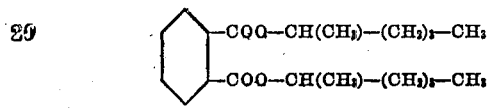

a di-sec.-hexyl phthalate

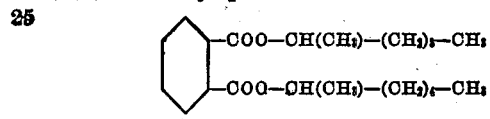

a sec.-hexyl sec.-heptyl phthalate

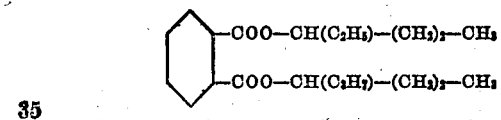

an isomer of the preceding compound

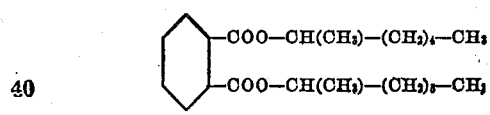

a sec.-hepthyl sec.-octyl phthalate.

Examples of acidic esters follow:

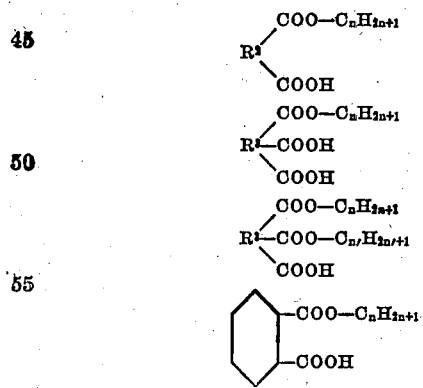

in which the various symbols have the same meanings as described above.

The mixed esters of the lower aliphatic alcohols with secondary hexyl and higher alcohols may be expressed with the four immediately preceding formulas, by substituting the hydrogen of the unesterified carboxyl groups by an alkyl group, as, for example, methyl, ethyl, isopropyl, n-butyl, or an amyl, either primary or secondary.

Likewise, the unreacted carboxyl groups in the immediately preceding formulas may be esterified with an alcohol containing more than one oxygen atom to the molecule, as, for example, with ethylene glycol, diethylene glycol, or ethoxyethanol ("Cellosolve").

As to properties, it should be added that the secondary esters forming the subject matter of my invention are only slowly volatile at atmospheric temperatures. They are compatible with pyroxylin, although some of the esters containing the largest percentage of carbon are less active as solvents for pyroxylin than homologous esters containing less carbon. Thus the secondary hexyl phthalates are good solvents for pyroxylin whereas the rate of solution of pyroxylin in the secondary octyl phthalates is quite slow. On the other hand, the octyl phthalates and those other esters which are poor solvents for pyroxylin have especially good solvent power for many resins that are characterized by solubility in hydrocarbons.

As stated, the esters described are useful as ingredients of pyroxylin compositions. Formulas illustrating such compositions follow.

In these formulas I use the term "Higher secondary esters" to indicate an ester or esters of the type that I have invented and described above. The pyroxylin used may be any commercial grade, and the varieties having comparatively low viscosities are preferable for many uses. An example of such low viscosity nitrocellulose is that which is sold as "½ second" nitrocellulose, the term "½ second" referring to a published method of determining viscosity. I express all proportions as parts by weight.

*Composition #1*

| | Parts |
|---|---|
| Pyroxylin | 12 |
| "Higher secondary esters" | 5 |

*Composition #2*

| | Parts |
|---|---|
| Composition #1 | 17 |
| Volatile solvent mixture comprising butyl acetate, toluol, ethyl acetate, alcohol, other volatile esters, alcohols, and/or hydrocarbons | 83 |

*Composition #3*

| | Parts |
|---|---|
| Composition #2 | 100 |
| Resin, such as dewaxed dammar, glycerol-rosin ester, and/or "amberole", etc. | 30–150 |

*Composition #4*

Composition #3 plus pigments, oils, and/or other additions that are now used in lacquers.

Many variations from the pyroxylin compositions given above or from other illustrative details given elsewhere in these specifications may be made without departing from the spirit of my invention. When, for example, esters of higher boiling point and/or higher solvent power for pyroxylin are required, I may use esters of any of the polycarboxylic acids disclosed with higher primary alcohols of boiling point above 150° C. and below 200° C., as for example n-hexyl, n-heptyl, or n-octyl alcohol. Esters of the higher primary alcohols may be made as described above for higher secondary esters.

I claim:

1. A neutral ester of ortho phthalic acid with a monohydric aliphatic secondary alcohol of boiling point above 132° C.

2. An ester containing the grouping of atoms represented by the type formula

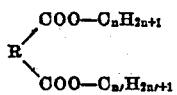

in which R represents an organic radical and n and $n'$, varying independently of each other, represent each a different integral number that is not less than 6 nor more than 8.

3. An ester containing the grouping of atoms represented by the type formula

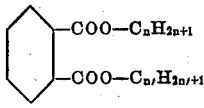

in which $n$ and $n'$, varying independently of each other, represent each an integral number that is not less than 6, the sum of $n$ plus $n'$ being not less than 13 nor more than 20.

4. An ester containing the grouping of atoms represented by the type formula

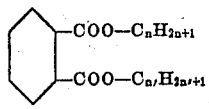

in which $n$ and $n'$, varying independently of each other, represent each an integral number that is not less than 7, nor more than 10.

5. A compound having the grouping of atoms represented by the type formula

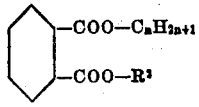

in which $C_nH_{2n+1}$ represents the radical of a secondary aliphatic alcohol having a boiling point above 132° C., and $R^2$ represents an alkyl radical.

ROBERT H. VAN SCHAACK, Jr.